(12) United States Patent
Tohjima (10) Patent No.: US 9,470,871 B2
(45) Date of Patent: Oct. 18, 2016

(54) LENS BARREL

(71) Applicant: KOWA COMPANY LTD., Nagoya-shi, Aichi (JP)

(72) Inventor: Tosao Tohjima, Soka (JP)

(73) Assignee: KOWA COMPANY, LTD. (JP)

( * ) Notice: Subject to any disclaimer, the term of this patent is extended or adjusted under 35 U.S.C. 154(b) by 0 days.

(21) Appl. No.: 14/374,099

(22) PCT Filed: Dec. 26, 2012

(86) PCT No.: PCT/JP2012/083552
§ 371 (c)(1),
(2) Date: Jul. 23, 2014

(87) PCT Pub. No.: WO2013/114769
PCT Pub. Date: Aug. 8, 2013

(65) Prior Publication Data
US 2014/0362459 A1 Dec. 11, 2014

(30) Foreign Application Priority Data
Jan. 30, 2012 (JP) .................. 2012-016037

(51) Int. Cl.
*G02B 7/02* (2006.01)
*G02B 7/04* (2006.01)
(Continued)

(52) U.S. Cl.
CPC . *G02B 7/04* (2013.01); *G02B 7/08* (2013.01); *G02B 7/09* (2013.01); *G03B 17/12* (2013.01); *G02B 7/102* (2013.01)

(58) Field of Classification Search
CPC .......... G02B 7/022; G02B 7/04; G02B 7/08; G02B 7/09; G02B 7/10; G02B 7/102; G02B 23/12; G02B 23/14; G02B 23/24; G02B 23/2446; G02B 23/2484; G03B 17/12; G03B 17/14; G03B 17/565
USPC ................ 359/823–825, 399, 422, 425, 426, 359/694–700; 348/374–376; 356/241.1
See application file for complete search history.

(56) References Cited

U.S. PATENT DOCUMENTS

| 3,088,370 A | 5/1963 | Erbe et al. .................... 350/255 |
| 4,601,539 A | 7/1986 | Watanabe ..................... 350/255 |

(Continued)

FOREIGN PATENT DOCUMENTS

| JP | 59204014 | 11/1984 |
| JP | 61246710 | 11/1986 |

(Continued)

OTHER PUBLICATIONS

European Search Report issued Aug. 18, 2015 in Appln. No. 12867608.7.

*Primary Examiner* — Loha Ben
(74) *Attorney, Agent, or Firm* — Adams & Wilks (57) ABSTRACT

A lens barrel has a telescopic structure in which an inner barrel and an outer barrel move relative to each other. A plurality of ring retainers (201 and 202) are disposed at different positions with respect to the optical axis direction between an inner barrel (11) and an outer barrel (12) to support a number of bearing balls (30) so that the bearing balls (30) roll in contact with the inner barrel (11) and the outer barrel (12). The retainers (201 and 202) are supported floatingly in a direction parallel to the optical axis in accordance with the rolling movement of the bearing balls (30). The inner barrel (11) and the outer barrel (12), which move relative to each other, are supported by the ball bearings.

3 Claims, 4 Drawing Sheets (51) Int. Cl.
*G02B 7/08* (2006.01)
*G02B 7/09* (2006.01)
*G03B 17/12* (2006.01)
*G02B 7/10* (2006.01)

(56) References Cited

U.S. PATENT DOCUMENTS

| | | | | |
|---|---|---|---|---|
| 4,709,311 | A | 11/1987 | Bornhorst | 362/277 |
| 5,835,272 | A | 11/1998 | Kodama | 359/557 |
| 6,879,445 | B2 * | 4/2005 | Hamasaki | G02B 7/102 |
| | | | | 359/694 |
| 7,102,837 | B2 * | 9/2006 | Hamasaki | F16D 41/105 |
| | | | | 192/38 |
| 7,531,942 | B2 * | 5/2009 | Hamasaki | H02N 2/163 |
| | | | | 310/323.01 |
| 8,939,652 | B2 * | 1/2015 | Peterson | F16C 33/32 |
| | | | | 384/492 |
| 2005/0219705 | A1 | 10/2005 | Tanaka | 359/601 |

FOREIGN PATENT DOCUMENTS

| | | |
|---|---|---|
| JP | 63071816 | 4/1988 |
| JP | 63163807 | 7/1988 |
| JP | 01265215 | 10/1989 |
| JP | 03164708 | 7/1991 |
| JP | 10319300 | 12/1998 |
| JP | 2010 48984 | 3/2010 |

* cited by examiner

LENS BARREL

TECHNICAL FIELD

The present invention relates to a lens barrel, and particularly to a lens barrel having a telescopic structure comprising an inner barrel and an outer barrel that move relative to each other.

BACKGROUND ART

A telescopic structure comprising an outer barrel and an inner barrel has heretofore been used widely in lens barrels for optical devices, such as cameras for taking motion/still pictures, for the purpose of performing focusing or zooming.

This type of telescopic structure is provided therein with focusing or zooming optical elements, and a movable barrel for adjusting them and a fixed barrel (at the side of a camera body, for example) are slidably coupled with each other in an inner and outer barrel relationship.

In conventional devices such as primitive telescopes, a structure has been used in which an inner barrel having an outer diameter and an outer barrel having an inner diameter substantially the same as the outer diameter of the inner barrel are simply slidably coupled with each other in one or more stages, and the positional relationship between respective barrels is manually adjusted so as to move straight. In modern optical devices, however, a modified structure is widely employed in which the relative positional relationship between respective barrels can be adjusted by a structure that converts a rotational movement of a focusing ring (or zooming ring) rotated manually or rotated by a drive means such as a motor to a relative movement amount of each barrel in the optical axis direction (thrust direction) using a screw mechanism such as helicoid or a spiral cam.

For small and light-weight lens having a short focal length, a structure is used in which an inner barrel and an outer barrel of a lens barrel are coupled so as to slide directly, making it possible to relatively easily provide accuracy in focusing or zooming operation and durability of sliding parts and mechanisms such as gears in the driving system. This also makes it possible for all of manual or motor driving systems to perform focusing or zooming adjustment with a small operation force within a reasonable range.

However, in a case where optical elements that are to be moved relatively and barrels for holding them are large and heavy such as in telephoto or super-telephoto lens having a focal length of, for example, 100 mm order, an operation force (e.g., motor driving torque) is required for relative movement of barrels when they have a coupling structure in which the inner barrel and the outer barrel directly slide in a simple manner. In addition, the friction due to contact of the barrels may possibly cause backlash and play, thereby deteriorating the accuracy and durability of the telescopic mechanism in itself or the driving mechanism such as gears and motors.

The technique disclosed in Patent Literature 1 below aims to solve the problems in terms of backlash and play of the barrels, accuracy, durability and operation force by employing a ball-bearing support between guide bars and lens holding frames that move relative to each other in the optical axis direction for a structure in which a mechanism is provided to restrict the relative movement of the barrels using a guide bar sliding mechanism.

PRIOR ART LITERATURE

Patent Literature

[Patent Literature 1] JP2010-048984A

SUMMARY OF THE INVENTION

Problems to be Solved by the Invention

In the structure described in the above-mentioned Patent Literature 1, the ball-bearing support is provided only between the guide bars and the lens holding frames, and the coupling between the barrels still remains in a directly sliding manner. Accordingly, a large frictional force may occur particularly at sliding parts of the heavy barrels, still causing the above-described problems such as backlash and play of the barrels, accuracy, durability and operation force.

In view of the above problems, it is an object of the present invention to provide a structure of a lens barrel capable of moving an inner barrel and an outer barrel relatively in a smooth and accurate way even in a large and heavy lens barrel and capable of eliminating problems in terms of backlash and play of the barrels, accuracy, durability and operation force.

Means for Solving the Problems

To achieve the above-mentioned object, the present invention employs a configuration such that, in a lens barrel having a telescopic structure comprising an inner barrel and an outer barrel that move relative to each other, a plurality of ring retainers are disposed at different positions with respect to an optical axis direction between the inner barrel and the outer barrel, the retainers supporting a number of bearing balls so as to roll in contact with the inner barrel and the outer barrel and being supported floatingly with respect to a direction parallel to the optical axis in accordance with the rolling movement of the bearing balls to provide a ball-bearing support to the inner barrel and the outer barrel that move relative to each other.

A further configuration is employed in which at least two or more ring retainers are disposed at different positions with respect to the optical axis direction between the inner barrel and the outer barrel.

A still further configuration is employed in which a member is provided to restrict a movable range within which the retainers move in the direction parallel to the optical axis between the inner barrel and the outer barrel in accordance with the rolling movement of the bearing balls when the inner barrel and the outer barrel move relative to each other.

Advantageous Effect of the Invention

According to the above configuration, the inner barrel and the outer barrel that constitute the telescopic structure of the lens barrel can be supported by ball bearings around the whole circumference of the inner and outer circumferential surfaces of these barrels, so that for any of manual or motor driving systems, the inner barrel and the outer barrel can move smoothly relative to each other by a small driving force without causing a large frictional resistance. This makes it possible to reduce the burden on the driving mechanisms such as gears and motors that cause the inner barrel and the outer barrel to move relatively, thereby improving the durability of the mechanism as a whole. The inner barrel and the outer barrel can thus be moved accurately relative to each other during a long period of time.

Moreover, according to the above configuration, it is needed only to dispose the ring retainers having a small width at necessary locations (two or more locations) between the inner/outer barrels, and the lens barrel can therefore be reduced in size and weight because a large and complex mechanism is not necessary for the retainers (and for bearing balls).

Furthermore, a plurality of ring retainers disposed between the inner barrel and the outer barrel are supported floatingly between the inner/outer barrels so that the retainers can move freely in a direction parallel to the optical axis direction in accordance with the relative movement of the inner/outer barrels. Accordingly, the rolling movement of the bearing balls is considerably smooth, and for any of manual or motor driving systems, the inner barrel and the outer barrel can be moved smoothly relative to each other by a small driving force.

In particular, at least two or more ring retainers are disposed at different positions with respect to the optical axis direction between the inner barrel and the outer barrel, and the inner barrel and the outer barrel are supported by ball bearings at different positions with respect to the optical axis direction. This allows the inner barrel and the outer barrel to be accurately aligned relative to each other, causing no deviation or backlash and play, particularly in a direction crossing the optical axis, and the inner/outer barrels (and optical elements supported by them) can thus be correctly aligned so as to constantly and accurately match the optical axis.

A member is also provided to restrict a movable range within which the retainers move in the direction parallel to the optical axis between the inner barrel and the outer barrel in accordance with the rolling movement of the bearing balls when the inner barrel and the outer barrel move relative to each other. This allows eccentricity of the retainers or interference thereof to other members, or erroneous operation of the lens barrel resulted therefrom to be prevented effectively.

BRIEF DESCRIPTION OF DRAWINGS

FIG. 1 is a perspective view showing a lens barrel employing the present invention with a part thereof being seen through.

EMBODIMENTS FOR CARRYING OUT THE INVENTION

Modes suitable for carrying out the present invention will hereinafter be described in detail with reference to embodiments shown in the accompanying drawings.

Embodiments

Figure 1:
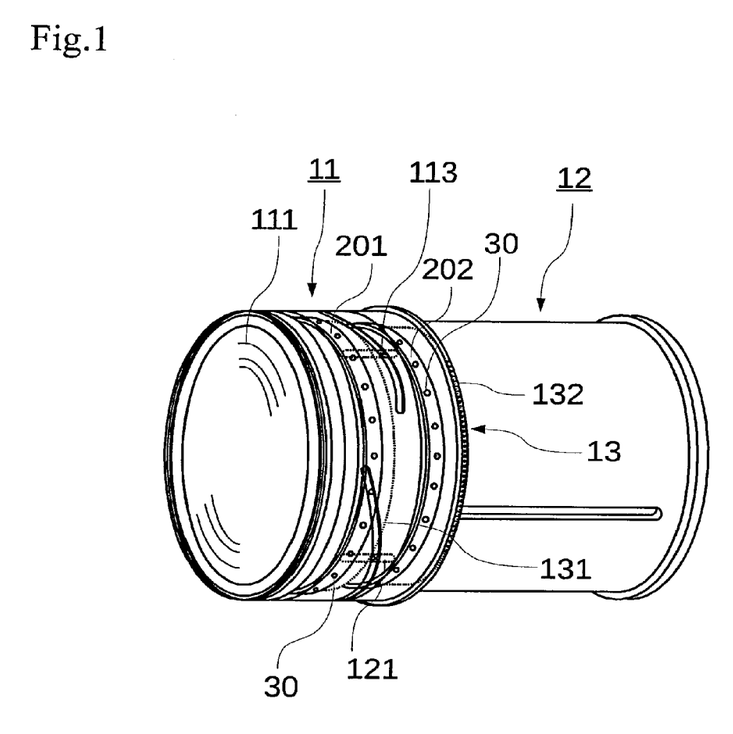
Figure 2:
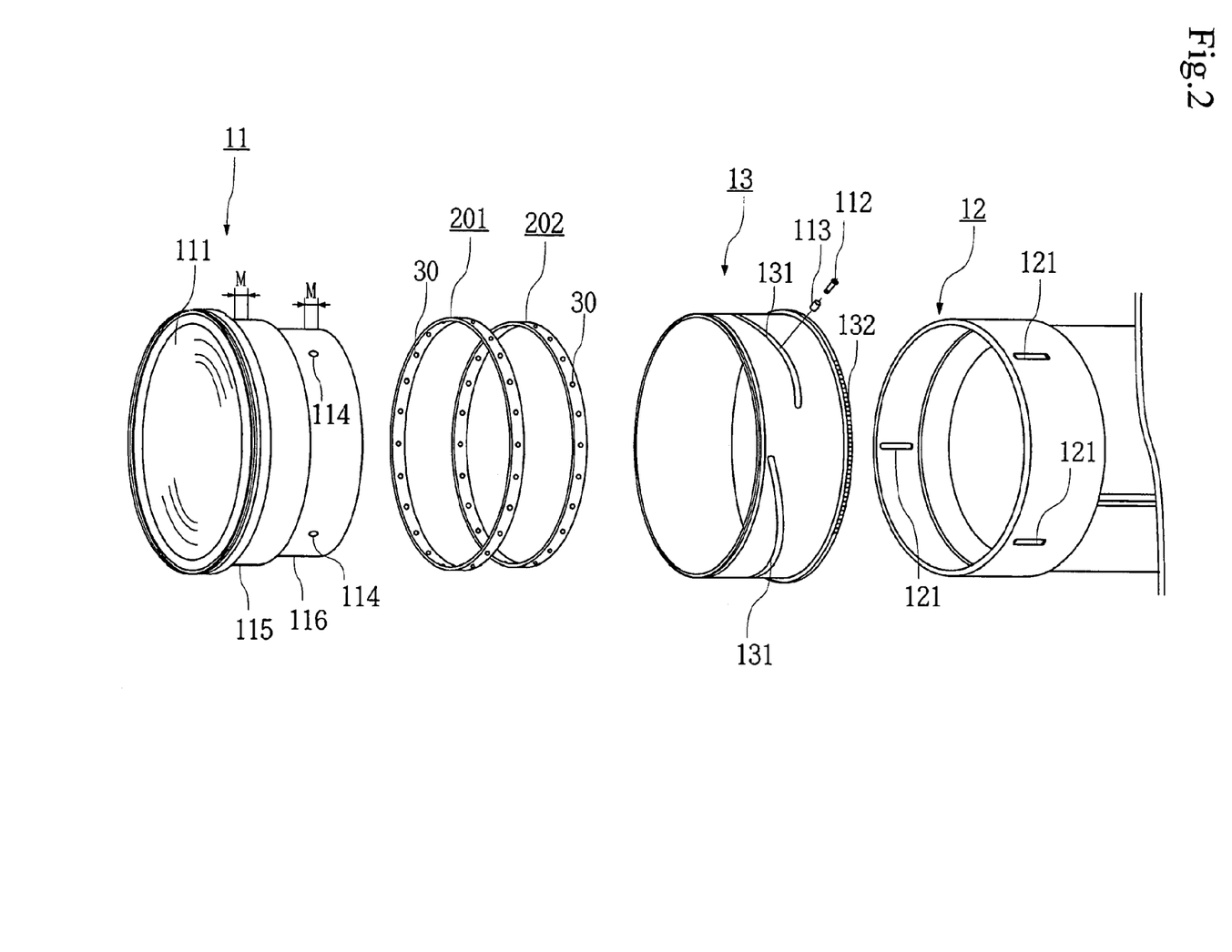
FIG. 2 is an exploded perspective view showing the whole structure of the lens barrel shown in FIG. 1.
Figure 3A:
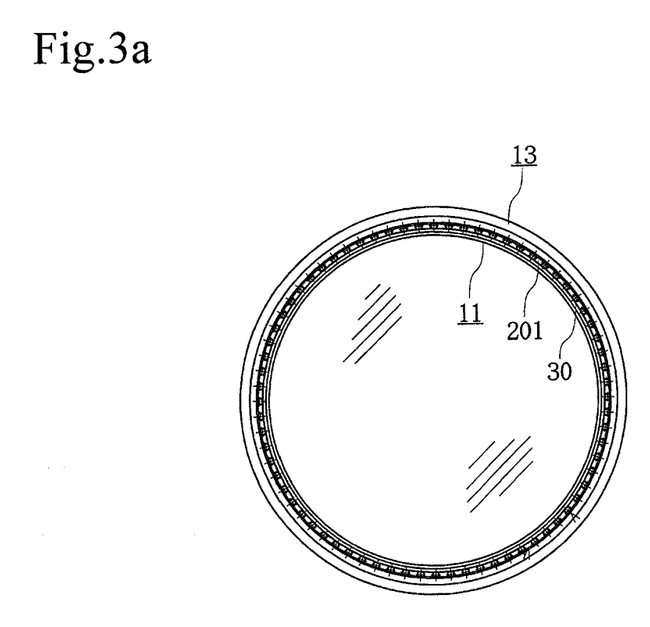
FIG. 3a is an illustrative view showing the front of the lens barrel shown in FIG. 1.
Figure 3B:
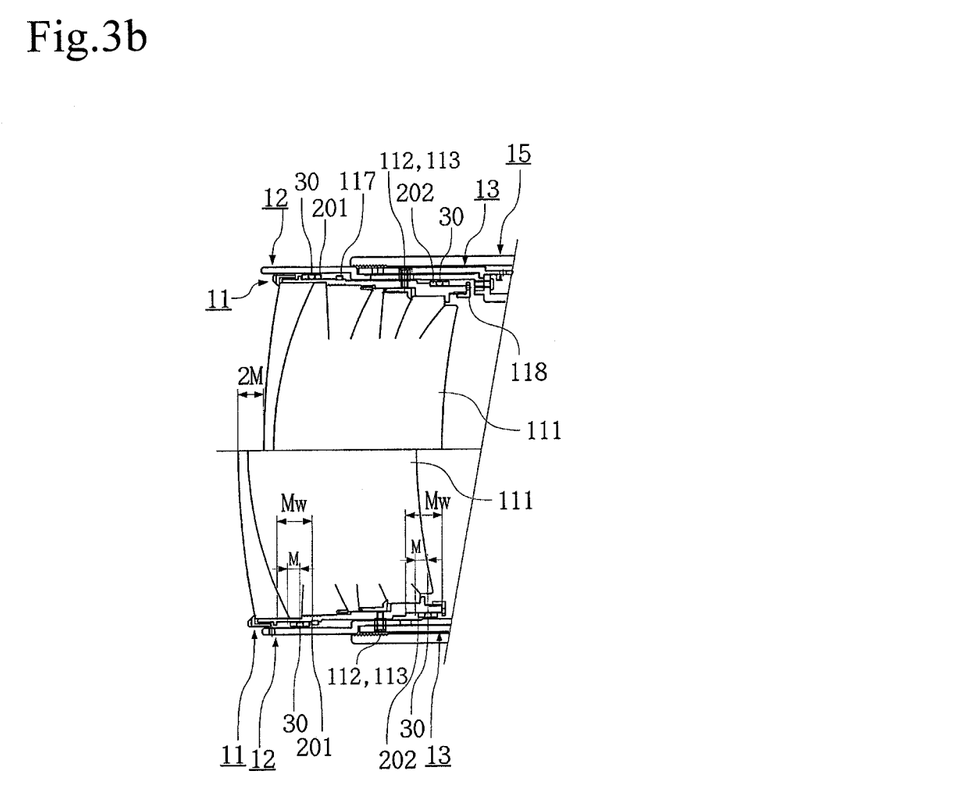
FIG. 3b is an illustrative view showing a cross-section of the lens barrel shown in FIG. 1.

FIG. 1 to FIG. 3 show the structure of a lens barrel that employs the present invention. The present embodiment provides an example of a telescopic coupling structure of the lens barrel according to the present invention in which a front group barrel at the front of the lens is moved relative to a rear group barrel that accommodates a subsequent group of optical elements (group of rear group optical elements, which may include not only a rear lens but other optical elements such as a group of zooming optical elements, for example).

As shown in FIG. 1 and FIG. 2, a telescopic coupling structure of the lens barrel may include three cylindrical structural bodies, i.e., a front group barrel 11, a rear group barrel 12, and a focusing ring 13. These cylindrical structural bodies may preferably be manufactured by a suitable method such as cutting-out and die casting using an appropriate material such as metal (lightweight metal such as aluminum and duralumin may be desirable in particular for a large lens such as super-telephoto lens).

The front group barrel 11, the rear group barrel 12 and the focusing ring 13 are assembled as shown in cross-section in FIG. 3b.

According to the present embodiment, the relationship between the inner barrel and the outer barrel in the telescopic structure of the lens barrel is such that the front group barrel 11 constitutes an inner barrel while the rear group barrel 12 an outer barrel (note, however, that the relationship between the front group and the rear group, and the inner (barrel) and the outer (barrel), is not limited to the above, and the front/rear and the inner/outer relationship of these members may also be opposite to that of the structure as shown). The front group barrel 11 and the rear group barrel 12 are coupled so that the latter accommodates the former and both can move relative to each other in the optical axis thrust direction. The focusing ring 13 is further attached as another outer barrel to the outside of the rear group barrel 12.

The front group barrel 11 accommodates front group lenses 111, and the rear part of the front group barrel 11 is configured with circumferential surfaces having different diameters as denoted by reference numerals 115 and 116 in the present embodiment.

For the circumferential surface 116, three screw holes 114 are provided at positions that divide the circumferential surface 116 into three parts. The screw holes 114 receive pins 112 that have their lower parts threaded and support guide rings 113 so as to be rotatable (only one set is shown in the middle of FIG. 2). The guide rings 113, which are rotatably supported by the pins 112, pass through three elongate holes 121 of the rear group barrel 12 to engage with three cam grooves (slits) 131 of the focusing ring 13 as will be described later.

The rear group barrel 12 accommodating the front group barrel 11 includes respective inner circumference surfaces that correspond to the two circumferential surfaces 115 and 116 of the front group barrel 11, as shown in FIG. 2. Ring retainers 201 and 202, which will be described later, are accommodated respectively between the circumferential surfaces 115, 116 of the front group barrel 11 and the corresponding inner circumference surfaces of the rear group barrel 12.

The rear group barrel 12 is provided with three elongate holes 121 for restricting the movement direction of the front group barrel 11 only to a straight direction. The previously-described guide rings 113 rotatably supported by the pins 112 pass through these elongate holes 121 to engage with the cam grooves 131 (only near-side ones are shown for simplicity) of the focusing ring 13 that is attached to the outside of the rear group barrel 12.

The cam grooves 131 of the focusing ring 13 have a spiral cam shape as shown in the figures. The focusing ring 13 is provided at the rear end with a gear portion 132 that engages with a pinion gear (not shown). A motor (not shown) rotates the pinion gear to cause the cam grooves 131 to push the three guide rings 113, which are provided upright via the pins 112 to the front group barrel 11, in the forward direction (leftward direction in FIG. 1 and FIG. 2) or in the backward direction (rightward direction in FIG. 1 and FIG. 2), so that the front group barrel 11 can be moved straight relative to the rear group barrel 12.

According to the present embodiment, the front group barrel 11 and the rear group barrel 12 are coupled by a ball-bearing support rather than being coupled to directly slide.

More specifically, the ring retainers 201 and 202 having different diameters are accommodated respectively between the two circumferential surfaces 115, 116 of the front group barrel 11 and the inner circumference surfaces of the rear group barrel 12 that face the circumferential surfaces 115, 116 thereof.

The retainers 201 and 202 are provided at the circumference with a number of circular holes that accommodate a number of bearing balls (hereinafter referred simply to as "balls") 30 made of an appropriate metal material such as steel so that the balls can freely rotate in the holes.

The difference between the radius of the two circumferential surfaces 115 and 116 of the front group barrel 11 on which each ball 30 rolls and the radius of the respective inner circumference surfaces of the rear group barrel 12 that face these circumferential surfaces 115 and 116 corresponds to a diameter of one ball 30 rotatably supported by each of the retainers 201 and 202. It is of course that each radius of circles that run through the centers of the thicknesses of the retainers 201 and 202 pass through the midpoint between the circumferential surfaces 115, 116 of the front group barrel 11 and the facing inner circumference surfaces of the rear group barrel 12.

FIG. 3a shows a cross-section of the lens barrel at a part of the retainer 201 in an assembled state. The retainer 201 supports a number (e.g., several tens) of balls 30 at regular intervals on its circumference between the front group barrel 11 and the rear group barrel 12 so that the balls can freely roll (the same applies to the retainer 202 at the rear side).

The telescopic structure of the lens barrel according to the present embodiment is characterized in that the inner barrel (front group barrel 11) and the outer barrel (rear group barrel 12) are supported by ball bearings, and in particular characterized in that a plurality (at least two as shown) of ring retainers 201 and 202 are disposed between the inner barrel (front group barrel 11) and the outer barrel (rear group barrel 12) to provide a ball-bearing support to the inner barrel (front group barrel 11) and the outer barrel (rear group barrel 12) at different positions with respect to the optical axis direction.

Moreover, unlike commonly-used bearings configured such that bearing balls roll in the circumferential direction, the retainers 201 and 202 as well as balls 30 are supported floatingly in the optical axis direction between the inner barrel (front group barrel 11) and the outer barrel (rear group barrel 12) to provide a structure in which the relative movement of the inner barrel (front group barrel 11) and the outer barrel (rear group barrel 12) causes the balls 30 to roll therebetween so that the retainers 201 and 202 (and therefore the balls 30 supported by the retainers 201 and 202) can freely move with respect to the optical axis direction. This structure thus has an advantage that useless sliding resistance is unlikely to occur.

When the inner barrel (front group barrel 11) and the outer barrel (rear group barrel 12) are moved relative to each other for the focusing purpose as in the present embodiment, the relative movable range of the inner barrel and the outer barrel (which is determined depending on the shape of the above cam grooves 131) corresponds to a relative movement distance of the inner/outer barrels (2M below) that is necessary for focusing over a range from the shortest imaging distance to the infinity. In this case, the movable range M (shown in FIG. 2 and FIG. 3b) within which each ball 30 rolls in the parallel direction to the optical axis in accordance with the relative movement of the inner barrel (front group barrel 11) and the outer barrel (rear group barrel 12) is just half the relative movable range 2M within which the inner barrel (front group barrel 11) and the outer barrel (rear group barrel 12) are driven and moved by the focusing ring 13 (FIG. 3b).

The reason why the movable range M of the balls 30 be just half the relative movable range 2M of the inner barrel (front group barrel 11) and the outer barrel (rear group barrel 12) is because, when the inner barrel (front group barrel 11) and the outer barrel (rear group barrel 12) move relative to each other, the balls 30 supported by the retainers (201 and 202) roll as if they kick off the respective contact surfaces of the inner barrel (front group barrel 11) and the outer barrel (rear group barrel 12) so that the balls 30 themselves roll only half the total relative movement amount (2M) of the inner barrel (front group barrel 11) and the outer barrel (rear group barrel 12) relative to each of the inner barrel (front group barrel 11) and the outer barrel (rear group barrel 12).

In the structure according to the present embodiment, the alignment position of the inner barrel (front group barrel 11) and the outer barrel (rear group barrel 12) on the optical axis is restricted by the balls 30 supported by the respective retainers 201 and 202.

Therefore, assuming that the retainers 201 and 202 could move freely in the whole space between the inner barrel (front group barrel 11) and the outer barrel (rear group barrel 12), the positions of the retainers 201 and 202 and each ball 30 with respect to the optical axis direction could not be guaranteed, making it impossible to maintain the correct alignment position of the inner barrel (front group barrel 11) and the outer barrel (rear group barrel 12) on the optical axis. In this regard, it may be preferred that the movable range of the retainers 201 and 202 is restricted to such a range that can ensure necessary movement amount of the inner barrel (front group barrel 11) and the outer barrel (rear group barrel 12) with respect to the optical axis direction using, for example, a specific structure of which the details are exemplified in FIG. 3b (details are omitted to be shown in FIG. 2).

Dimensions of such a movable range Mw (FIG. 3b) for restricting the movement of the retainers 201 and 202 may be those, in theory, obtained by adding at least the width of the retainers 201 and 202 (length with respect to the optical axis direction) to the above movable range M of the balls 30 (or further adding small margin).

As regards the restriction of the movable range Mw for the retainer 201, in the structure exemplified in FIG. 3b, a stopper ring 117 is attached to the circumferential surface 115 of the front group barrel 11 shown in FIG. 2 at a position corresponding to the right end in the figure of the movable range M of the balls 30, thereby allowing the retainer 201 to move only between the flange formed on the front group barrel 11 (corresponding to the left end in FIG. 2 of the movable range M of the balls 30 on the circumferential surface 115 of the front group barrel 11) and the stopper ring 117.

With regard to the rear end of the movable range Mw for the retainer 202, a flange ring 118 is attached, for the restriction, to the rear end of the circumferential surface 116 of the front group barrel 11 (corresponding to the right end position in FIG. 22 of the movable range M of the balls 30 on the circumferential surface 116 of the rear group barrel 12).

For the front end of the movable range of the retainer 202, a step between the circumferential surfaces 115 and 116 of the front group barrel 11 can be utilized, but in the structure exemplified in FIG. 3b, a further lower circumferential surface is provided further behind the step between the circumferential surfaces 115 and 116 of the front group barrel 11 (rightward in the figure) to accommodate the retainer 202 in a space corresponding thereto.

According to the structure as described above, the movement of the retainers 201 and 202 as well as the movement of each ball 30 with respect to the parallel direction to the optical axis can be restricted to within certain movable ranges Mw and M, respectively.

FIG. 3b shows the front portion of the lens barrel in cross-section in which it is divided into upper and lower sections with respect to the optical axis. The upper half section shown represents a position of the optical system and a state of each part when the inner barrel (front group barrel 11) and the outer barrel (rear group barrel 12) are adjusted to the to infinity, while the lower half section shown represents those when the inner barrel (front group barrel 11) and the outer barrel (rear group barrel 12) are adjusted to the shortest imaging distance.

Comparing the states of the upper and lower half sections in FIG. 3b, the front end of the front group lenses 111 travels a distance that corresponds to the total relative movable range 2M of the inner barrel (front group barrel 11) and the outer barrel (rear group barrel 12), while each ball 30 travels a distance that corresponds approximately to the movable range M, which is half the total relative movable range 2M. The retainers 201 and 202 travel a distance that corresponds approximately to the distance from one end to the other end of the movable range Mw, which is restricted in the above manner.

Numeral reference 15 in FIG. 3b denotes a cover that is provided to surround the circumference of the focusing ring 13. Such a cover 15 may be provided on the focusing ring 13 for the purpose of design or protection of the barrels.

As apparent from the above, unlike the structure in which ball bearings are disposed at parts of a guide bar sliding mechanism as shown particularly in Patent Literature 1, the telescopic structure according to the present embodiment is characterized in that the inner barrel (front group barrel 11) and the outer barrel (rear group barrel 12) are supported by ball bearings around the whole circumference of the inner and outer circumferential surfaces of these barrels. Accordingly, for any of manual or motor driving systems, the inner barrel and the outer barrel are enabled to move smoothly relative to each other by a small driving force without causing a large frictional resistance. This makes it possible to reduce the burden on the driving mechanism such as gears and a motor, thereby improving the durability of the mechanism as a whole. The inner barrel and the outer barrel can thus be moved accurately relative to each other during a long period of time.

In addition, according to the present embodiment, a plurality of ring retainers (201 and 202) are disposed between the inner barrel (front group barrel 11) and the outer barrel (rear group barrel 12) (at least two: the retainers are disposed at two locations in the present example, but it may be conceivable that the retainers are disposed at three or more locations.), so that the inner barrel (front group barrel 11) and the outer barrel (rear group barrel 12) are supported by ball bearings at different positions with respect to the optical axis direction. Therefore, the inner barrel and the outer barrel can be accurately aligned relative to each other to prevent the occurrence of deviation or backlash and play, particularly in the direction crossing the optical axis, and the inner/outer barrels (and optical elements supported by them) can be correctly aligned so as to constantly and accurately match the optical axis. Moreover, in the structure according to the present embodiment, it is needed only to dispose the ring retainers having a small width at necessary locations (two or more locations) between the inner/outer barrels, and the lens barrel can therefore be reduced in size and weight because a large and complex mechanism is not necessary for the retainers (and bearing balls).

Furthermore, according to the present embodiment, the ring retainers disposed between the inner barrel (front group barrel 11) and the outer barrel (rear group barrel 12) are supported floatingly between the inner/outer barrels so that the retainers can freely move in a direction parallel to the optical axis direction in accordance with the relative movement of the inner/outer barrels. Accordingly, the rolling movement of the bearing balls (30) is considerably smooth, and for any of manual or motor driving systems, the inner barrel and the outer barrel are enabled to move smoothly relative to each other by a small driving force.

Moreover, the movable range necessary in the direction parallel to the optical axis of the ring retainers (201 and 202) supported floatingly between the inner barrel (front group barrel 11) and the outer barrel (rear group barrel 12) is theoretically half the total relative movement amount of the inner barrel and the outer barrel at the most. Therefore, the retainers (201 and 202) can be disposed in a very small mounting space in the lens barrel, and the mount space efficiency can thus be considerably high.

In addition, the movable range necessary in the direction parallel to the optical axis of the ring retainers (201 and 202) can be restricted by a step formed between the inner barrel (front group barrel 11) and the outer barrel (rear group barrel 12) or simple and low cost structures such as stoppers/flange rings that are reduced in size and weight. It can thus be possible to effectively prevent eccentricity of the retainers (201 and 202) or interference of the retainers (201 and 202) to other members, or erroneous operation of the lens barrel resulted therefrom.

The above embodiments, as an example, include a supporting structure for the inner barrel (front group barrel 11) and the outer barrel (rear group barrel 12) which are moved relative to each other for the focusing purpose, but the structure of the lens barrel according to the present invention can widely be utilized as a supporting structure for an inner barrel and an outer barrel which are moved relative to each other for other purposes, such as for zooming and for near distance imaging (macro photography).

DESCRIPTION OF REFERENCE NUMERALS

11 . . . Front group barrel
12 . . . Rear group barrel
13 . . . Focusing ring
15 . . . Cover
30 . . . Bearing ball
111 . . . Front group lenses
112 . . . Pin
113 . . . Guide ring
114 . . . Screw hole
115, 116 . . . Circumferential surface 117 . . . Stopper ring
118 . . . Flange ring
121 . . . Elongate hole
131 . . . Cam groove
132 . . . Gear portion
201, 202 . . . Retainer

The invention claimed is:

1. A lens barrel having a telescopic structure comprising: an inner barrel and an outer barrel that move relative to each other; and a plurality of ring retainers that are disposed at different positions with respect to an optical axis direction between the inner barrel and the outer barrel, the retainers supporting a number of bearing balls so as to roll in contact with the inner barrel and the outer barrel and being supported floatingly with respect to a direction parallel to the optical axis in accordance with the rolling movement of the bearing balls to provide a ball-bearing support to the inner barrel and the outer barrel that move relative to each other.

2. The lens barrel as recited in claim 1, wherein at least two or more ring retainers are disposed at different positions with respect to the optical axis direction between the inner barrel and the outer barrel.

3. The lens barrel as recited in claim 1, wherein a member is provided to restrict a movable range within which the retainers move in the direction parallel to the optical axis between the inner barrel and the outer barrel in accordance with the rolling movement of the bearing balls when the inner barrel and the outer barrel move relative to each other.

* * * * *